United States Patent
Lundsgaard et al.

[11] 3,886,971
[45] June 3, 1975

[54] APPARATUS FOR REGULATING THE RATIO OF MIXING OF TWO FLUID FLOWS

[76] Inventors: Jorgen Schjerning Lundsgaard, Bontvedvej 29, 5700; Hans Peter Degn, Karlskilde, 5633, Knarreborg, both of Denmark

[22] Filed: Mar. 20, 1973

[21] Appl. No.: 343,134

[30] Foreign Application Priority Data
Mar. 20, 1972 Denmark............................ 1297/72

[52] U.S. Cl................................. 137/599; 137/606
[51] Int. Cl................................................ B01f 5/00
[58] Field of Search ........... 137/597, 599, 601, 605, 137/606, 607; 235/201 R, 201 ME

[56] References Cited
UNITED STATES PATENTS

| | | |
|---|---|---|
| 3,072,146 | 1/1963 | Gizeski ............................ 137/599 X |
| 3,712,325 | 1/1973 | Harnoncourt...................... 137/597 |
| 3,722,510 | 3/1973 | Parker ............................ 137/599 X |
| 3,809,109 | 5/1974 | Breiling et al. ................. 137/607 X |
| 3,830,256 | 8/1974 | Cox................................. 137/606 X |

Primary Examiner—Alan Cohan
Assistant Examiner—Gerald A. Michalsky
Attorney, Agent, or Firm—Watson, Cole, Grindle & Watson

[57] ABSTRACT

An apparatus for regulating the composition of a mixture of two fluid flows or the flow rate of one fluid comprises a plurality of parallel flow resistors, such as tubes, having relative fluid conductivities in accordance with a binary system, i.e., 1,2,4,8. . . . $n$.

Valves connected to the flow resistors are used to insert the resistors in either fluid flow or to turn the resistors on and off.

4 Claims, 3 Drawing Figures

APPARATUS FOR REGULATING THE RATIO OF MIXING OF TWO FLUID FLOWS

BACKGROUND OF THE INVENTION

The present invention relates to an apparatus for regulating the ratio of mixing of two fluids flows while maintaining a constant overall flow-rate.

In the technique of anaesthesia and in many other fields as well it is a common procedure to mix two gases or liquids by combining the flows from two needle valves. In order to change the composition of the mixture without changing the total flow rate both valves have to be adjusted simultaneously and by the same amount but in opposite directions. This requires great care and is difficult to do exactly, because the flow through a needle valve does not depend linearly on the angle of rotation of the needle. Because of this non-linearity and the requirement for simultaneous adjustment such as apparatus with needle valves is not suitable for electric control. Furthermore the calibration of the needle valve is sensitive to dust particles in the orifice and to mechanical wear of the needle and the orifice.

In the respirograph technique for the measurement of the rate of respiration as a function of the oxygen tension in suspensions of biological material a mixture of $O_2$ and $N_2$ is used, wherein the $N_2$ content changes linearly with the time. To produce linear gradients in liquid mixtures an apparatus is known consisting of two identical cylinders into which pistons are pushed at the same rate. Such an apparatus can also be used to produce accurate linear gradients in gas mixtures. However, the apparatus is not suitable for kinetic measurements because the pistons must be pulled back and the cylinders refilled with pure gases before each gradient. Furthermore a continuous flow of a gas mixture of a constant composition cannot be produced with such an apparatus.

The object of the invention is to provide an apparatus of the kind referred to which is able to produce a mixture of two fluids of any desired mixing proportion while maintaining a constant total flow rate in such a way that the accuracy of regulation is the same throughout the range of regulation, whereby the regulation can be carried out linearly with time in a simple manner.

SUMMARY OF THE INVENTION

According to the invention the apparatus comprises at least one set of parallel connected flow resistors, the ratios of the fluid conductivities of said resistors being in accordance with a binary system and said resistors being connectable into the flow paths of the two fluids by valve means in such a manner that one flow resistor of each size is connected alternatively in one or the other flow path. Thus the flow resistors of a set of resistors have the conductivities 1,2,4,8 etc. measured in arbitrary units of conductivity. By switching one or more flow resistors from one fluid to the other the flow rate of each fluid can be regulated in steps of one or more of said units. Because each resistor is always conducting one of the two fluids, the total flow rate can be kept constant. The magnitude of the minimal regulation step decreases with increasing number of resistors in the set. If one fluid flow is turned off the apparatus can obviously be used to regulate the other fluid flow alone.

When the apparatus is used for producing a fixed arbitrary mixture composition or when the response time after switching to another composition is unimportant, a structurally single embodiment of the invention can consist of one set of flow resistors, the outlets of which are interconnected and the inlets of which are connected to two-way valves the two inlets of each valve being connected to respective supply lines of the two fluids.

In such cases where the response time is important i.e. where the retardation and transients due to the dead spaces constituted by the flow resistors must be avoided, a further embodiment of the invention may consist of two identical sets of parallel flow resistors, the inlets of each set being connected to respective supply lines of fluids and the outlets being interconnected, whereby each flow resistor is connected to on-off valve means and the valve means associated with flow resistors of the two sets with identical fluid conductivity are interconnected in such a manner that one is open while the other is closed and vice versa.

In a still further embodiment of the invention the said interconnecting may be done by connecting the flow resistors of the two sets with identical fluid conductivity to respective inlets of a two-way valve. This embodiment has the advantage of structural simplicity. When the valve is switched from one resistor to the other, i.e., from one fluid to the other, a small lag due to the dead space in the valve will occur. This disadvantage is avoided in an embodiment of the invention, wherein each flow resistor has a respective on-off valve, the valves associated with identical flow resistors being arranged to be controlled simultaneously in opposite direction to open and closed position respectively.

The valves are either mechanical valves operated by turning a shaft of a program mechanism or they are magnetic valves controlled by a device with digital electric output signals such as a computer or an analog-to-digital convertor.

In a further embodiment of the invention the flow resistors are orifices such as nozzles. They have the advantage that when the difference between the upstream and downstream pressures exceeds the limit of sonic flow through the orifice the flow rate is not dependent on the downstream pressure. If the fluids are gases, the use of orifices as flow resistors at low flow rates will require holes of very small diameter which may be difficult to make in a reproducible way and which are sensitive to dust particles. These shortcomings are avoided in another embodiment of the invention in which the flow resistors are tubes.

An inexpensive embodiment of the invention is achieved when the resistors are pieces of tubes of identical opening diameter and having lengths in accordance with the binary system.

In stead of making the resistors from orifices or tubes of different conductivities, the resistors may in a still further embodiment of the invention consist of parallel combinations of different numbers of identical orifices or tubes, the ratios of said numbers being in accordance with a binary system. The conductivity of each assembly of orifices or tubes is then proportional to the number of identical orifices or tubes. Such an arrangement assures that the ratios of the conductivities of the resistors are under all conditions independent of the upstream and downstream pressures.

BRIEF DESCRIPTION OF THE DRAWINGS

The invention will now be described in more detail with reference to the accompanying drawings in which.

DESCRIPTION OF THE PREFERRED EMBODIMENT

Figure 1:
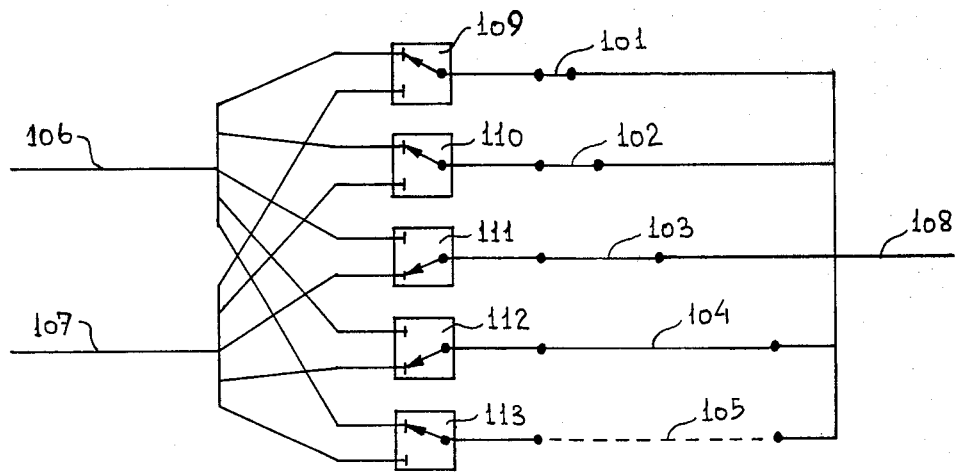
FIG. 1 is a schematic diagram of an embodiment of the present invention.

Referring now to FIG. 1, there is illustrated a fluid mixing apparatus comprising a plurality of tubes 101–105 connected to valves 109–113 respectively. The valves are two-way valves the two inlets of which are connected to supply lines 106 and 107 for two fluids. The tubes 101–105 are connected to a common outlet 108 for the fluid mixture produced and their conductivities are 1,2,4,8 and 16 measured in arbitrary units of conductivity. It is appreciated that the switching of one or more valves from one fluid to the other will cause the total flow rate in outlet 108 to remain constant, whereas the content of one fluid in the mixture is changed by one or more units of a total of 31 units of all conductivities combined. The valves can be activated manually or mechanically or they can be magnetic valves.

Figure 2:
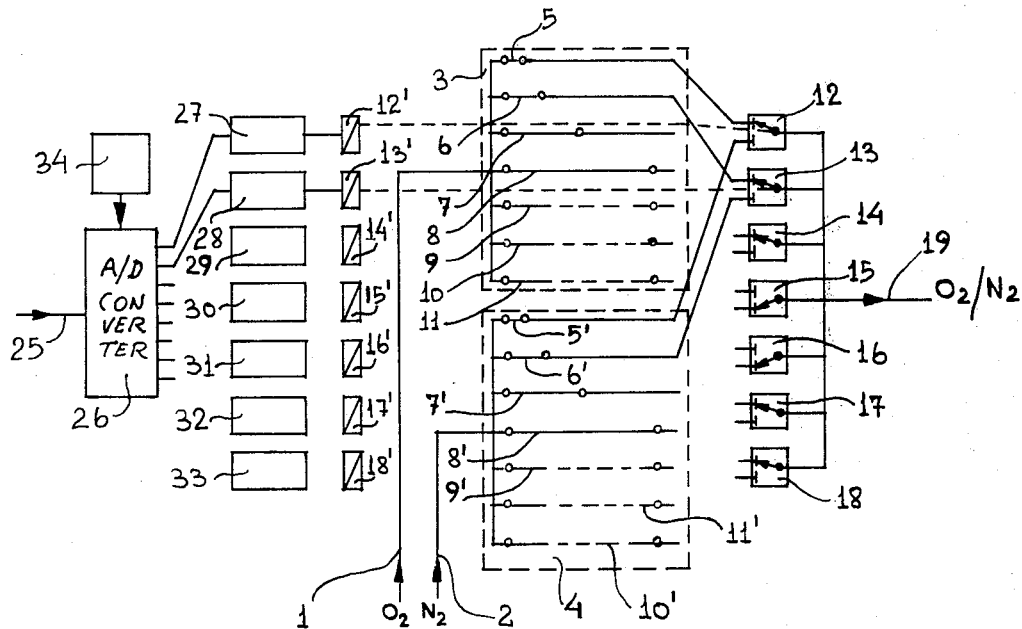
FIG. 2 is a diagram of another embodiment of the invention with control equipment attached thereto.

FIG. 2 illustrates a mixing apparatus for oxygen and nitrogen where the pure gases are supplied through supply lines 1 and 2. Each supply line is connected to a set of parallel tubes 5–11 and 5′–11′ respectively. These tubes have the conductivities 1,2,4,8,16,32 and 64 measured in arbitrary units. The tubes of the two sets 3 and 4 are identical two by two and identical pairs are connected to the two inlets of two-way magnetic valves 12–18. The outlets of the valves are connected to a common outlet 19 for the mixture produced.

Figure 3:
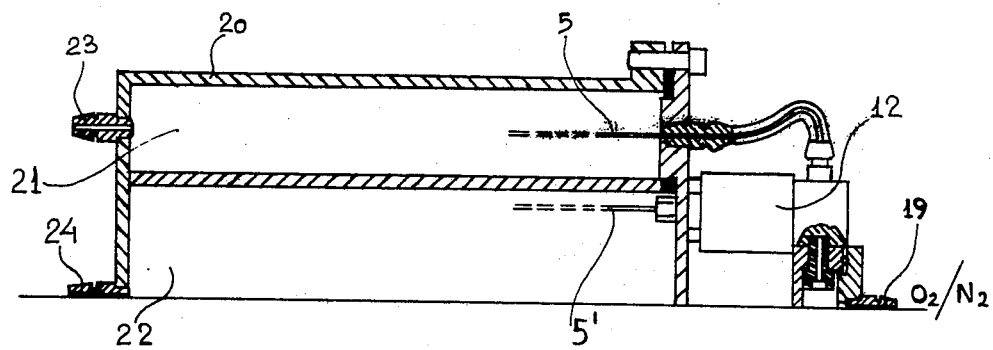
FIG. 3 is a longitudinal section of a practical embodiment of the invention.

FIG. 3 illustrates one half of a longitudinal section of a cylindrical container 20 which is divided into two concentric cylindrical compartments 21 and 22 respectively with inlets 23 and 24 to which the supply lines 1 and 2 are connected. In the compartments 21 and 22 the tubes 5–11 and 5′–11′ respectively are situated which tubes are of plastics material and have identical opening diameter and the lengths 1,2,4,8,16, 32 and 64 units of length. The figure shows only the tubes 5 and 5′ which are connected to the magnetic valve 12. The magnetic valves 12–18 are positioned on a circle at the end wall of the cylinder. The outlets of the valves are connected to the common outlets 19 as shown. The position of the tubes in compartments holding the appropriate gases prevents any contamination of the gases due to diffusion through the walls of the tubes.

In FIG. 2 is also shown an example of a control unit for the mixing apparatus. An electric voltage is used to control the composition of the mixture. The voltage is supplied through a conductor 25 to an analog-to-digital convertor 26 and the binary output signals from the convertor are applied through amplifiers 27–33 to the coils 12′–18′ of the magnetic valves 12–18. In the diagram is also shown a separate clock pulse generator 34 which is required because the clock pulse generator built into the A/D convertor operates at a higher frequency than the maximum switching frequency of the magnetic valves. The apparatus shown has seven flow resistors in each set and the total sum of conductivities is 127 units. Accordingly, the smallest step of regulation is 1/127 of the total flow. This value can be increased or decreased as desired by decreasing or increasing the number of resistors in a set. It is seen that an approximately linear change with time of the composition of the mixture is obtained by changing the input voltage on the conductor 25 linearly with time. Obviously any other desired time course of the composition of the mixture can also be obtained.

It is to be noted that the inverse proportionality of the fluid conductivity of the tube to their lengths which is utilized in the apparatus depends on the existence of laminar flow through the whole length of the tube. This condition defines a lower limit of tube length which can be used. Since two gases usually have different dynamic viscosities, the upstream pressures have to be different in order to result in the same flow rates through identical resistors.

It is immediately seen that the apparatus shown and described above can be used to regulate only one flow of fluid if the supply of the other fluid is turned off. Instead of using two-way valves as shown, each resistor tube can be fitted with its own one-way valve in which case the two valves belonging to identical resistors should always be in opposite positions.

Instead of the control shown in FIG. 2 the magnetic valves can also be operated by individual switches or by a programmed rotary switch.

We claim:

1. An apparatus for regulating the ratio of mixing two fluids from separate fluid supplies while maintaining a constant overall flow rate of the fluids, the apparatus comprising:

two identical sets of parallel connected flow resistors, the ratios of the fluid conductivities of said resistors of each set being in accordance with a binary system;

valve means including a plurality of two-way valves for connecting said resistors into the flow path of a respective fluid, the inlets of each of said sets being connected to a respective fluid supply and the outlets of said flow resistors of said sets having the identical fluid conductivity being connected to inlets of a respective said two-way valve such that only one flow resistor of each conductivity valve is connected at a time for enabling flow in its respective flow path, and the outlets of said two-way valves being interconnected for combining the fluids into a single flow path.

2. An apparatus according to claim 1, wherein said valve means are magnetic valves controlled by digital signals.

3. An apparatus according to claim 1, wherein the flow resistors are tubes.

4. An apparatus according to claim 3, wherein the resistors are pieces of tubes of identical opening diameter having different lengths in accordance with a binary system.

* * * * *